April 7, 1970   D. BECKER   3,504,966
FILM PROJECTOR WITH AUTOMATIC CORRECTION OF THE
FRAMING OF THE PICTURE
Filed Nov. 6, 1967   2 Sheets-Sheet 1

United States Patent Office 3,504,966
Patented Apr. 7, 1970

3,504,966
FILM PROJECTOR WITH AUTOMATIC CORRECTION OF THE FRAMING OF THE PICTURE
Dietrich Becker, Stuttgart-Mohringen, Germany, assignor to Zeiss Ikon Aktiengesellschaft, Stuttgart, Germany, a corporation of Germany
Filed Nov. 6, 1967, Ser. No. 680,799
Claims priority, application Germany, Nov. 16, 1966, Z 10,918
Int. Cl. G03b 21/46
U.S. Cl. 352—160                        4 Claims

ABSTRACT OF THE DISCLOSURE

A film projector with automatic picture framing means and an operating device for driving the projector forwardly and reversely. A picture framing member is adapted to be electromagnetically adjusted by the same push-buttons which are used to operate the operating device.

Figure 1:
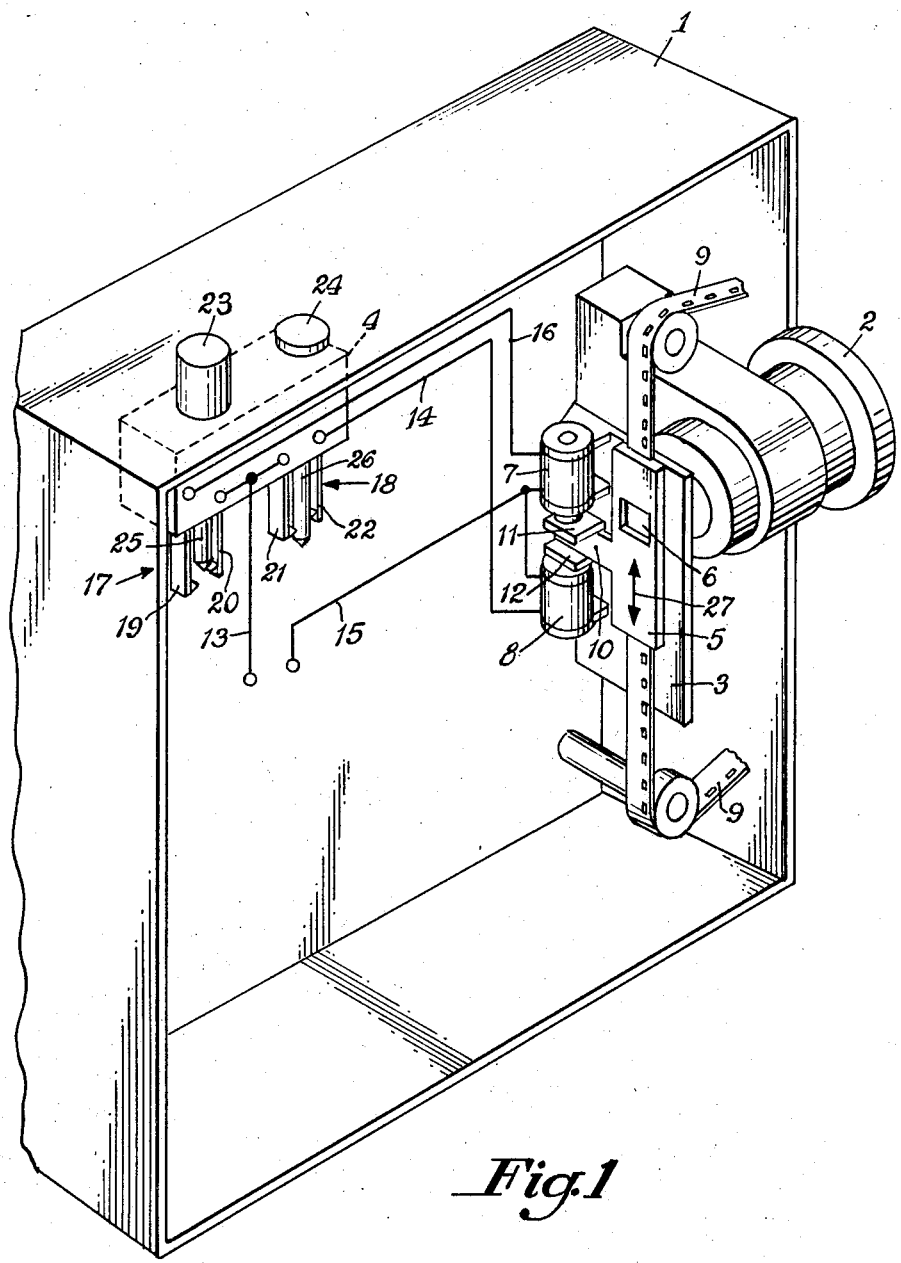

In a second embodiment of the invention, the cam-controlled film gripper device is electromagnetically adjusted whenever the operating device is operated to adjust or to frame the film relative to the picture window of the projector.

---

The invention relates to a film projector in which an automatic adjustment of the framing of the picture is effected by the operating means which controls the forward and reverse operations of the projector.

It is known to couple the device for the forward and reverse operation of the projector with a device for adjusting the framing of the picture. For the coupling of these two devices are used lever mechanisms having a number of joints and fulcrums. Such lever mechanisms require much space. The more joints and fulcrums they contain, the greater must the precision be in manufacturing such linkages if the mechanism is to operate with sufficient accuracy. For this reason, only parts arranged relatively close together are suitable to be connected by these known lever mechanisms, yet the whole assembly still remains quite complex.

Another disadvantage of these known devices is that they can be used only in directly, manually operated projectors. If the projector is operated by one of the popular remote control devices, they fail. Although the projector may be changed from forward to reverse and vice versa, an adjustment of the framing of the picture does not take place.

It is the object of the present invention to provide with a simple means a connection between the operating device for controlling the forward and reverse operation of the projector, which may possibly be accommodated also in a remote control device, and the device for the framing of the picture. Such a connection according to the invention is to require little space, operate sufficiently accurate without a great deal of complex mechanical means and permit the installation of the forward and reverse switches at almost any place of the projector housing or even detached therefrom. The latter is desirable for the reason that thereby almost any requirement as to exterior design and ease of operation can be met.

This is accomplished according to the invention in that the forward-reverse operating device is connected with at least one switch for controlling an electromagnetically movable adjusting member for the correction of the framing of the picture.

According to the invention, the movable magnetic structural element itself may carry or form the adjusting member for the correction of the framing of the picture.

Another feature of the invention provides for two elecromagnets which depending upon the operative position of the forward-reverse device operate alternatingly.

The forward-reverse change-over means according to the invention comprises two push-buttons, each of which may be connected to a switch of its own in a magnetic control circuit.

According to yet another feature of the invention, these two push buttons may also be connected to one change-over device in a magnetic control circuit and so actuate it that it alternately assumes different operative positions.

These and other objects of the invention will in the following be described in detail by way of two exemplary embodiments illustrated in the accompanying drawings. Details not pertinent to the invention are omitted for clarity of illustration.

Figure 2:
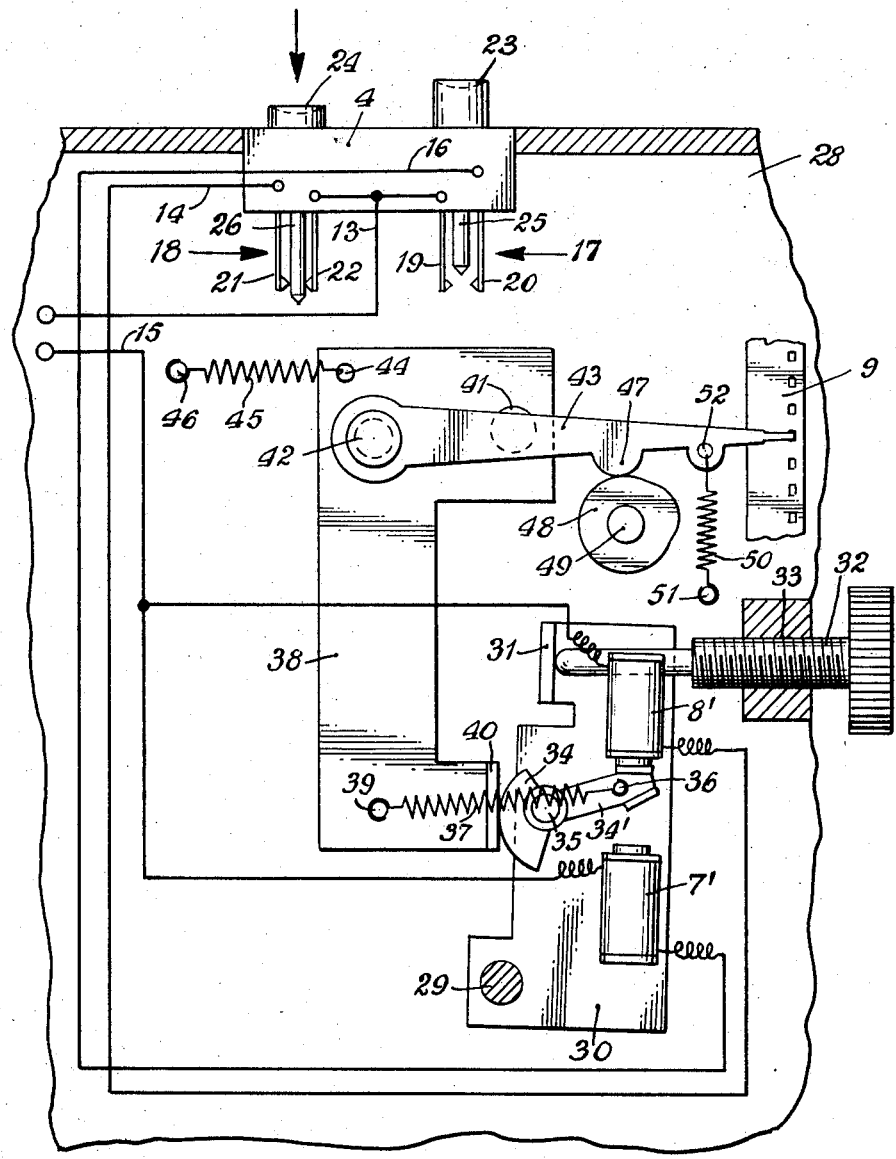

In the drawings:

FIG. 1 is a simplified perspective view of the adjusting device according to the invention as applied to the adjustment of a picture window mask, and FIG. 2 is a simplified diagrammatic view of the adjusting device according to the invention as applied to the adjustment of a bearing supporting a film gripper.

Referring to FIG. 1, in a projector housing 1 are arranged a lens system 2, a vertical film track 3 and a terminal block 4. Slidably secured to the film track 3 is a picture window mask 5 having a picture window 6, and fixedly secured to the film track 3 are two axially aligned and axially spaced electromagnets 7 and 8. Guided between the film track 3 and the picture window mask 5 is a film strip 9. The picture window mask 5 has a laterally extending rectangular projection 10 which in turn is provided with two rectangularly bent-off horizontal tongues 11 and 12 which are spaced from each other. This projection 10 extends into the space formed between the two axially aligned electromagnets 7 and 8. The electromagnets 7 and 8 are connected to a not illustrated source of current by means of electric conductors 13, 14, 15 and 16. Included in the supply circuits of the electromagnets 7 and 8 are switches 17 and 18, each formed by contact fingers 19, 20 and 21, 22 respectively, and by a contact pin 25 controlled by a push button 23 and a contact pin 26 controlled by a push button 24, respectively, all emanating from the terminal block 4. A double arrow 27 indicates the vertical direction of slidability of the picture window mask 5 relative to the fixed film track 3.

Pushing the button 23 for forward operation of the projector results in a closing of the electric circuit of the electromagnet 7 associated with the forward position of the picture window mask 5. The electromagnet 7 pulls the picture window mask 5 upward by attracting the upper tongue 11 on the mask 5.

Pushing the button 24 for reverse operation of the projector closes the circuit of the other electromagnet 8 and the picture window mask 5 by way of attracting the lower tongue 12 is pulled downward into its reverse position. Therefore the displacement of the picture caused by the play of the gripper tooth in the perforations of the film 9 as the direction of transportation of the film is changed, does not become visible on the projection screen.

The embodiment of the invention illustrated in FIG. 2 has a projector housing 28 equipped with a device for framing of the picture by hand combined with an automatic adjustment device for changing from forward to reverse. For this purpose the electromagnets 7' and 8' controlled by way of the push buttons 23 and 24 are secured to a plate 30 arranged in a vertical plane and pivotable about a horizontal pin 29 which is fixedly secured to the projector housing 28. The pivotable plate 30 has a rectangularly bent off portion 31 which is engaged by a horizontal adjusting screw 32 as will be described later. This adjusting screw 32 passes threadedly through a threaded bore 33 in the projector housing 28 and serves as a manual adjustment member for the framing of the pictures, i.e. to compensate picture position deviations on different film strips.

Also connected to the pivotable plate 30 between its ends by means of a pivot pin 35 is a mushroom-shaped adjustment member 34. The stem 34' of this adjustment member 34 is provided with a pin 36 which is engaged by one end of a spring 37 the other end of which is attached to a pin 39 mounted on the lower part of a likewise pivotable plate 38. The stem 34' of the mushroom-shaped member 34 projects into the space between the two axially aligned electromagnets 7' and 8'. The pivotable plate 38 has at its lower end a rectangularly bent off portion 40 which is engaged by the head portion of the mushroom-shaped member 34 due to the action of the tension spring 37. This head portion of the member 34 is so formed that when the member 34 is pivoted, the distance between the pivot pin 35 and the portion 40 is changed. The upper portion of the pivotable plate 38 is mounted on a pivot pin 41 and carries a pin 42 on which the rear end of a gripper 43 is mounted. Finally, the upper end of the pivotable plate 38 is also provided with a hole 44 into which is hooked one end of a spring 45, the other end of which is secured to a pin 46 on the projector housing 28.

The horizontally disposed gripper 43 has on its lower side a semi-circular enlargement 47 engaging a rotatable control cam 48 mounted on the shutter shaft 49 of the projector. A spring 50 attached with one end to a pin 51 on the projector housing 28 and with its other end hooked into a bore 52 in the gripper 43 holds the gripper 43 with its enlargement 47 in engagement with the control cam 48.

The position of the adjusting device as illustrated in FIG. 2 is that of the reverse operation of the projector. The reverse button 24 is in the depressed position. It has closed the circuit of the electromagnet 8'. The latter attracts the stem 34' of the mushroom-shaped adjustment member 34 and pivots it anti-clockwise about the pin 35. Thereby and in consequence of the particular shape of the head portion of the mushroom-shaped member 34 the distance between the bearing pin 35 and the angularly bent off portion 40 of the pivotable plate 38 which is held in engagement with said cap portion of the member 34 by the action of the tension spring 37, has been diminished. The pivotable plate 38 has been pivoted about its pivot pin 41 by the action of the spring 45, taking along the pin 42 which serves as a bearing for the gripper 43. The desired adaptation of the gripper 43, which engages the perforations in the film 9, to the reverse drive of the projector is therewith completed.

If the projector is to be changed from reverse to forward drive, the forward button 23 has to be pushed. When this has been done, the electromagnet 8' will be without current, while the electromagnet 7' is energized and attracts the stem 34' of the mushroom-shaped adjustment member 34 and by pivoting the same clockwise about the axis of the pin 35 puts the adjustment member 34 in its forward position. Again, the particular shape and position of the adjusting member 34 effects a change in the distance between the pivot pin 35 and the angularly bent off section 40. The plate 37 is pivoted clockwise about its pivot pin 41 against the action of the spring 45 and this causes the gripper bearing, i.e the pin 42, to be displaced.

During both of the aforedescribed operations the pivotable plate 30 remains unchanged in its position. This position is determined by the pivot pin 29 fixedly secured to the projector housing 28 and by the adjusting screw 32 which due to the action of the spring 45 is engaged by the angularly bent off portion 31 of the pivotable plate 30.

For a manual framing of the picture the adjustment screw 32 is rotated. This causes the plate 30 to pivot about its pivot pin 29 and, consequently, the plate 38 is pivoted also for the purpose of adjusting the pin 42 by which the gripper is supported.

What I claim is:

1. A film projector provided with automatic picture framing means, including an operating device for the forward drive and reverse drive of the projector, an adjustable picture framing member, and electromagnetic means for adjusting said framing member, said electromagnetic means including two electromagnets and circuit means for alternatingly energizing said electromagnets depending upon the position of said operating device which selectively effects an operation of said forward drive and said reverse drive.

2. A film projector according to claim 1, in which said electromagnetically adjustable framing member forms a part of said electromagnetic means.

3. A film projector according to claim 1, in which said operating device comprises two push buttons for actuating said forward drive and said reverse drive, and means for connecting said push butons with switch means connected in said circuit means.

4. A film projector according to claim 1, in which said operating device comprises two push buttons for actuating said forward drive and said reverse drive, and a separate switch for each of said two push buttons in said circuit means and incorporated in said operating device.

References Cited

UNITED STATES PATENTS 2,974,840    3/1961    Kuhnert et al. _____ 352—160

FOREIGN PATENTS 1,169,778    5/1964    Germany.

JOHN M. HORAN, Primary Examiner

R. A. WINTERCORN, Assistant Examiner

U.S. Cl. X.R.

226—49, 64; 242—55.12; 352—169, 173